Aug. 22, 1961  F. H. NICKLE ET AL  2,997,088
EARCORN REDUCING MACHINE
Filed April 14, 1958

INVENTORS
Frank H. Nickle
Arthur G. Nickle
William A. Nickle
BY Learned, Learned, & McCulloch
ATTORNEYS

United States Patent Office 2,997,088
Patented Aug. 22, 1961

2,997,088
EARCORN REDUCING MACHINE
Frank H. Nickle, 1672 Lathrup St., Arthur G. Nickle, 814 Madison St., and William A. Nickle, 1823 Lathrup St., all of Saginaw, Mich.
Filed Apr. 14, 1958, Ser. No. 728,424
15 Claims. (Cl. 146—123)

This invention relates to roll type earcorn reducing machines. More especially it discloses a machine for reducing earcorn, with or without husks, to obtain a coarse product, the reduction being ample if the ears of corn are severed into two cylindrical sections not exceeding seven inches in length. This amount of reduction affords an earcorn product that is readily handled by conventional bucket elevators having relatively small buckets as compared with the size required for whole earcorn. Earcorn reducing machines of this character are used ahead of corn shellers, also hammer grinding mills that produce livestock feeds containing corn and cob meal.

Conventional crushers made for coarse crushing of earcorn experience trouble with whole ears of corn escaping through the reducing chamber, especially so when starting and stopping. An object of this invention is to provide a machine having built-in means for controlling and limiting the maximum axial length of earcorn sections discharged therefrom regardless of whether the reducing roll is in motion or at rest.

To avoid escape of whole ears of corn through conventional crushers, such machines are usually built to produce more reduction than is necessary, the result being a product containing an excess of small particles of cob, the size of these cob particles approaching that of the kernels of corn. Those cob fines are undesirable when the product is to be put through a sheller to complete the shelling operation, as conventional corn shelling machines are not well adapted for separating such cob fines from the shelled corn. Therefore, it becomes an object of this invention to provide a reducing machine that produces a coarsely reduced earcorn product containing a minimum of cob fines.

Another object is to provide a flow controlling mechanism that can be operated partially closed without danger of clogging the discharge outlet with corn husks; and likewise, can be partially closed without materially increasing the fineness of the reduced corncob in the product. A further object is to provide an improved closure for a handhole opening into the reducing chamber, the opening affording the operator convenient access to tramp metal fed into the reducing zone.

Other improvements in roll type earcorn reducing machines will be apparent from the following description taken in connection with the drawing in which.

Figure 3:
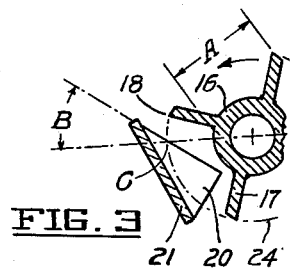
Figure 6:
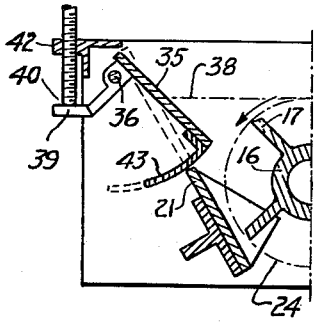
Figure 2:
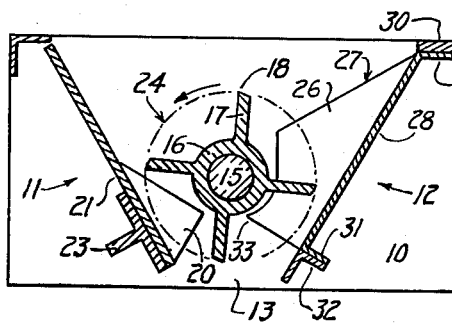
FIGURE 2 is a transverse sectional elevation taken on line 2—2 of FIGURE 1.
Figure 4:
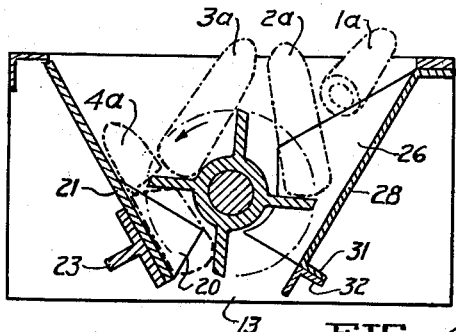
Figure 5:
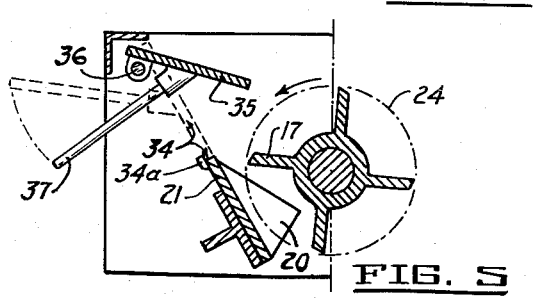

FIGURE 3, corresponding to FIGURE 2, is a fragmentary transverse sectional view defining the secantal distance between successive roll teeth and the rake angle on the working faces of the stationary impact receiving blades;

FIGURE 4, corresponding to FIGURE 2, illustrates in broken lines the successive positions of a moving ear of corn which is oriented into a vertical plane prior to being fed into the reducing zone;

FIGURE 5, similar to FIGURE 2, is a fragmentary view showing a closure plate for handhole opening in side wall of housing, the closed position being indicated by broken lines;

FIGURE 6 similar to FIGURE 5, shows the closure plate adjustably positioned to reduce the rate of discharge of reduced material.

Figure 1:
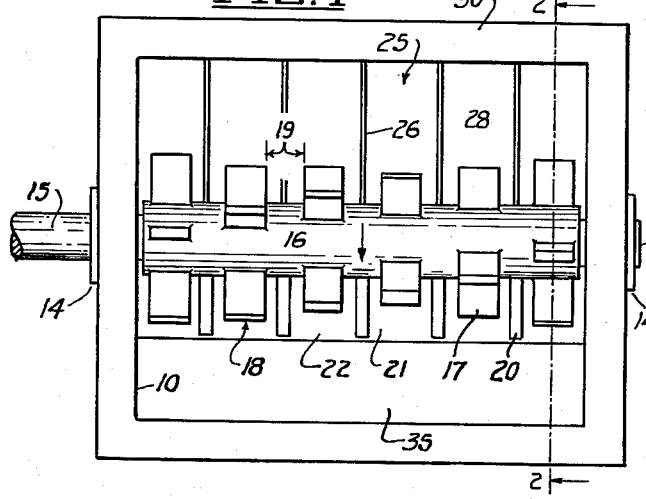
FIGURE 1 is a plan view of an earcorn reducing machine embodying our invention.
Figure 7:
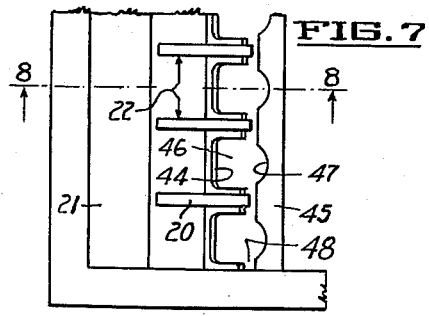
Figure 8:
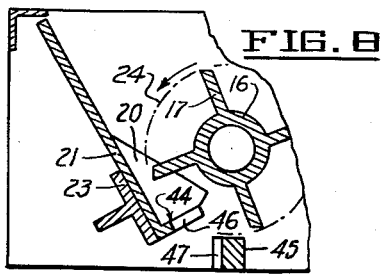

FIGURE 7 is a fragmentary plan view, similar to FIGURE 1, with the toothed rotative element removed to show how auxiliary impact receiving elements may be installed therebelow to obtain more shelled corn in the reduced product;

FIGURE 8 is a fragmentary sectional elevation taken on line 8—8 of FIGURE 7.

The earcorn reducing machine disclosed in FIGURES 1 and 2 comprises a reducing chamber having end walls 10 and inclined side walls generally designated as 11 and 12, the side walls converging to form bottom outlet 13 for discharge of reduced material. Journaled in bearings 14 supported by end walls 10 is a rotatable shaft 15 driven at a speed of 500–600 r.p.m. by any suitable means, the direction of rotation being indicated by the arrow. Mounted upon shaft 15 for rotation therewith is a tubular roll element 16 to which radially projecting teeth 17 are welded. Teeth 17 are formed with a distal end cutting edge 18 that is in parallel relation with the axis of rotation. The tooth projection, which will be referred to later, is the radial distance from the periphery of element 16 to the end cutting edge of a tooth. Roll teeth 17 are arranged in axially spaced annular rows, the space between rows being indicated as 19, FIGURE 1. Each row has three or more circumferentially spaced teeth with distal end cutting edges traveling in substantially the same path of revolution, the adjacent rows being preferably indexed a few degrees to align cutting edges 18 in helical formation, so that not more than one tooth will be delivering impact at the same instant.

In each of axial spaces 19 is positioned a stationary blade 20 which projects inwardly and downwardly from breaker plate 21 to receive impact from the sides of adjacent descending roll teeth when a horizontally disposed ear of corn is reduced. Breaker plate 21 receives impact from the end of a roll tooth when a vertically disposed ear of corn is reduced. Blades 20, combined with breaker plate 21 provide a series of longitudinally spaced U-shaped passageways 22 through which the roll teeth descend. Passageways 22 are adapted to receive a vertically disposed ear of corn with either end pointing downwardly, and to guide and slidably support the downgoing ear of corn when severed by the distal end cutting edge of a descending roll tooth. Breaker plate 21 also serves as the lower part of side wall 11, and is supported in close relation to tooth circle 24 by T-shaped cross member 23.

The toothed rotative element is operated with the teeth submerged in downcoming earcorn. Under the influence of agitation derived from the moving roll teeth, the ears tend to arrange themselves either horizontally over blades 20 or else in an upright position with either end pointing downwardly into an underlying passageway 22. The vertically disposed ears of corn are severed transversely to obtain cylindrical sections having an axial length that is relatively long as compared with sections sheared from horizontally disposed ears of corn. The sheared sections, however, have substantial length and are not shorter than is desirable. This relationship will be subsequently explained.

Referring to FIGURE 4, position 4a shows in dot and dash lines a vertically disposed downgoing ear of corn in passageway 22, the lower end being seated against the back face of a leading roll tooth, the point of support being substantially midway of the tooth projection. Supported in this manner, the moving ear of corn is engaged by end cutting edge 18 of a follower tooth, the bite being a fixed distance above the point of support. This fixed distance, which will be referred to as "secantal distance A," FIGURE 3, determines the axial length of the lower earcorn section when severance is completed by the follower tooth. If the remaining upper section is longer than the secantal distance, it will be subsequently reduced in length in the same manner when the roll turns an additional 90°. Disregarding the left-over end, it can be stated that these severed sections will have a predetermined axial length that substantially equals secantal distance A. The roll teeth are circumferentially spaced to limit the secantal distance between successive teeth to not more than seven inches.

To afford roll teeth adapted for supporting a vertically disposed downgoing ear of corn while being severed to length, the teeth are formed with an axial width that is not less than half the clear distance between blades 20. This limitation also prevents downward escape of unreduced ears of corn or bare corn cob between blades 20 and the sides of the descending roll teeth.

When a horizontally disposed ear of corn descends into the reducing zone, in parallel relation with the impact receiving wall 11 of the chamber, and lands upon blades 20, it is reduced into a plurality of sections by multiple shearing action of the descending roll teeth, the axial length of these sheared sections being substantially equal to the center-to-center spacing of supporting blades 20. To obtain sheared sections having a length that is less than the sections severed from a vertically disposed ear of corn, blades 20 and roll teeth 17 are axially spaced a distance not exceeding 7/10 of secantal distance A. Accordingly, if the roll teeth are secantally spaced to produce 6 inch severed sections, the sheared sections will be approximately 4 inches in length, thereby insuring a coarse product in which the longer sections are more accurately severed to length than the sheared sections. In either case the left-over end sections are disregarded. To increase the coarseness of the product, means will be presently disclosed for orienting a major portion of the ears of corn into substantially a vertical position before they are reduced.

Referring to FIGURES 1, 2, and 4, the means employed for orienting a major portion of the downcoming ears of corn into substantially an upright position, prior to feeding into passageways 22, comprises a series of elongated U-shaped earcorn receiving pockets, generally designated as 25, which are longitudinally spaced to straddle the rows of ascending roll teeth. Pockets 25 are separated by vertical plates 26 which are substantially normal to the axis of the toothed rotative element, and which project inwardly between the ascending rows of teeth. Plates 26 have an upper marginal edge 27 that slopes downwardly towards the rotative element. Bottom element 28 of the pockets also slopes downwardly, the lower portion being positioned in close relation to tooth circle 24. The bottom element also serves as the inclined side wall of the chamber, generally referred to as 12. To afford a removable pocket assembly, bottom plate 28 is provided with an upper flange 29 that is secured to cross rail 30 of the chamber housing. Likewise, plate 28 is flanged at 31 for bolting to cross member 32. As this construction provides elongated receiving pockets that are relatively narrow in width as compared with the axial length of an ear of corn, it will be understood that the ear must be oriented into a vertical plane that is substantially normal to the roll axis in order to fall into an underlying pocket.

FIGURE 4 illustrates the approximate successive positions of a moving ear of corn being oriented into an earcorn receiving pocket and moved forwardly in substantially an upright position for feeding into passageway 22. Position 1a shows a downcoming ear of corn angularly disposed with reference to pockets 25 which are separated by vertical walls 26 having downwardly sloping marginal edges 27. When the lower end of the descending ear comes in sliding contact with edge 27, it is swung around, under the influence of agitation derived from the ascending roll teeth and oriented into parallel relation with vertical walls 26, thereby permitting it to fall into an underlying pocket. Oriented into the pocket, it slides downwardly endwise into the path of an ascending roll tooth which lifts it into position 2a. In position 2a the lower end is supported upon the upper or working face of a tooth that is termed a "leading tooth." Turning the roll 180° advances the ear of corn into position 3a where it is beginning its descent into passageway 22. In this position, the lower end is now supported in abutting relation with the back of the leading tooth instead of its face as formerly. In this position the distal end cutting edge of a follower tooth bites into the ear at a measured distance from its point of support, the distance being equal to the previously defined secantal distance A. Bitten in this manner, the ear of corn is projected downwardly against the breaker plate or side wall of the chamber at the speed of the roll teeth, severance being completed at the bitten point as the follower tooth descends. The length of the severed lower section, as previously mentioned, is substantially equal to the predetermined secantal distance. The severed lower section is discharged through outlet 13 as soon as the roll advances far enough to free it from the confines of passageway 22. The upper severed section, if longer than the lower one, will be subsequently reduced in the same manner as the roll turns. Consequently, it can be said that unreduced ears of corn, having a length that is not appreciably in excess of secantal distance A, will be deterred from escaping through the reducing zone, regardless of whether or not the toothed rotative element is in motion. Also, this holds true with respect to whole ears escaping through pockets 25 on opposite sides of the roll, as there is always an interfering tooth within the confines of the pocket.

With further reference to earcorn receiving pockets 25, vertical separator plates 26 are made to support a pointed end 33 underlying rotative element 16 and in close relation thereto as shown. These pointed ends serve as means for stripping off husks that become entangled on the rotative element and teeth, the freed husks being deflected downwardly through bottom outlet 13.

In conventional earcorn crushers having stationary impact receiving blades such as 20, there is a tendency for husks to loop over a blade and become entangled thereon to the extent that the output of the reduced prodct is curtailed. In the present invention this difficulty is eliminaed by forming blades 20 (FIGURE 3) with a working face that slopes downwardly, so that the entangled husks can be swept off by the adjacent descending roll teeth. Accordingly, blades 20 are formed with a negative radial rake angle "B" which is not less than 22½° with respect to impact receiving point "C," point C aligning laterally with tooth circle 24. Angle B is the included angle between a line coinciding with the face of tooth 20 and a radial line passing through point C.

When tramp metal or other uncrushable material is fed into the reducing zone, a drive pin (not shown) associated with shaft 15 shears off and permits the toothed roll to stop instantly. To retrieve the intercepted metal, side wall 11 of the reducing chamber is provided with a handhole opening 34, as shown in FIGURE 5, the opening preferably extending the full distance between end walls 10. Opening 34 is provided with a hinged closure plate 35 which is pivoted to the housing structure at 36 to swing inwardly and upwardly against the downcoming earcorn. To afford the operator leverage for opening the closure, it is provided with removable handle 37. In closed position, plate 35 rests against stop 34a, so that it cannot swing outwardly when impact is received from the roll teeth.

Pivotally mounted plate 35, FIGURE 5, serves primarily as a closure, however, when this plate is swung inwardly and adjustably positioned to receive impact from the roll teeth, as illustrated in FIGURE 6, it serves as a means for controlling but not completely interrupting the discharge rate of the reduced material. The rate of discharge is varied by simply varying the intake area of the reducing zone. The intake area is arbitrarily assumed to be an imaginary horizontal plane 38 which extends outwardly from the top of tooth circle 24 to side wall 11. When plate 35 is swung inwardly and rigidly supported to receive impact from the roll teeth, the effective intake area of and space occupied by the reducing zone is decreased and likewise the output of the machine. In other words, increasing the angularity of plate 35 with respect to wall 11 tends to deflect the oncoming ears of corn upwardly and out of reach of the roll teeth. To adjust the angularity of plate 35 by remote control, the plate is provided with an outwardly projecting arm 39 which bears upwardly against bottom end 40 of vertical control stem 41. Stem 41 is in threaded engagement with supporting bracket 42, so that when rotated by handle 43, the output of the machine is varied.

This method of obtaining flow regulation does not afford a complete cutoff of the reduced material. It does, however, provide sufficient control for feeding earcorn, with or without husks, to corn shellers, hammer grinding mills, and other machines that are subject to overloading. It is a characteristic of conventional earcorn crushers, equipped with a bottom discharge gate, that when operated with the gate partially closed, the gate opening tends to become clogged with husks, thereby making the machine inoperative. Also, with the gate partially closed, the cob is reduced much finer, thereby, as previously mentioned, producing an excess of cob fines that are undesirable when the product is to be fed to a corn sheller. As the herein disclosed flow controlling mechanism is applied to the intake of the reducing zone, the clogging of discharge outlet 13 with husks is completely overcome. Also, varying the rate of discharge does not materially modify the fineness of the reduced cob.

With further reference to FIGURE 6, when plate 35 is swung inwardly, this opens a gap at the lower edge of the plate. To close this gap against escape of material undergoing reduction, plate 35 is provided with a detachable arcuate flange 35a, this flange being removed by the operator to afford access to tramp metal caught in the reducing zone.

The foregoing pertains to a machine that produces a coarse product containing severed earcorn sections that are only partially shelled. If more shelling action is desired, to obtain substantially bare cob sections, this is accomplished by the modifications shown in FIGS. 7 and 8, in which the bottom of each passageway 22 is made with an internal rib 44 that forms a shouldered U-shaped recess 46 through which the roll teeth descend. Underlying the roll in close relation to tooth circle 24, and in spaced relation from rib 44, is a longitudinally disposed ledger bar 45, the impact receiving face of which is formed with concave recesses 47 longitudinally spaced in complementary relation with recesses 46 in ribs 44. Opposed recesses 46—47 afford an orifice that is small enough to loosen and scrape substantially all of the corn kernels off the cob when a severed earcorn section is forced endwise through the orifice by a follower tooth. The positioning of ledger bar 45 in spaced relation from ribs 44, or the lower extremities of passageways 22, provides hoizontally disposed slots 48 communicating between adjacent orifices. The slotted orifices facilitate discharge of corn husks.

It should be apparent that we have perfected an earcorn reducing machine in which is incorporated novel and useful improvements that considerably advance the art of reducing earcorn. It is understood that various changes may be made in this disclosure to achieve like results without departing from the spirit of the invention or the scope of the claims.

In the claims:

1. A machine for reducing bulk material having, in combination, a housing for receiving material to be reduced, end and side walls defining the housing, said housing including a bottom outlet for the discharge of reduced material, a rotative element journaled in the end walls, teeth projecting from the rotative element to engage material in the housing, a side wall positioned in close relation to descending roll teeth, said wall comprising a movable upper section and a stationary lower section that are positioned to receive impact from the descending roll teeth when material is reduced, means for varying the rate of discharge through the outlet, said means being the movable section adjustably positioned to vary its space relation with said descending roll teeth, and means for limiting outward movement of said movable section.

2. A machine for reducing material as set forth in claim 1, further including an arcuated element projecting outwardly from the lower part of said movable section for preventing outward escape of material when said movable wall section is swung inwardly.

3. A reducing machine as set forth in claim 1, further including rotatable means for adjustably positioning said pivotal section.

4. A reducing machine as set forth in claim 3, wherein the rotatable means includes a stem projecting above the housing with a control handle mounted thereon.

5. A machine for reducing an earcorn to a generally predetermined length having, in combination, a housing for receiving earcorn to be reduced, end and side walls defining the housing, the housing having a bottom outlet for the discharge of reduced material, a rotative element journaled in the end walls, teeth projecting outwardly from the rotative element to engage earcorn, said teeth having laterally disposed end cutting edges arranged in axially spaced apart annular rows with three or more teeth in each row, a side wall of the housing being positioned to receive impact from descending roll teeth, longitudinally spaced stationary blades projecting inwardly from the impact-receiving side wall to position a blade in each of the axial spaces between the annular rows of teeth, said impact receiving wall and blades forming a series of U-shaped generally vertical passageways adapted to receive and guide an endwise downgoing ear of corn undergoing reduction in length, means for simultaneously supporting and transversely severing a guided downgoing ear of corn to sever a lower section therefrom having a length that substantially equals the predetermined length, said supporting means being a point on the upper face of a descending roll tooth and said severing means being the end cutting edge on a follower tooth, and means for controlling the length of said severed lower section, said length-controlling means being the annulated teeth circumferentially spaced to afford a secantal distance between said supporting point and said cutting edge that equals the predetermined length of aforesaid severed earcorn section.

6. A machine for reducing earcorn as set forth in claim 5, further including means for shelling corn kernels from the cob of said severed-to-length earcorn section, said means including a longitudinally disposed auxiliary impact-receiving bar underlying the U-shaped passageways and in close relation to the roll teeth, said bar having a receiving face with a series of concave recesses, said recesses longitudinally spaced in complementary relation with the bottom openings of said U-shaped passageways to provide orifices adapted to receive lower end of a downgoing severed-to-length section of earcorn, and means for forcing said severed section downwardly through an underlying orifice to shell kernels of corn from the severed cob section, said forcing means being the follower tooth that severed said cob section.

7. In an earcorn reducing machine having, in combination, a housing for receiving earcorn to be reduced, vertical end walls and downwardly converging side walls defining the housing, said housing having a bottom outlet for the discharge of reduced material, a rotative element journaled in the end walls, axially spaced annular rows of teeth projecting outwardly from the rotative element to engage earcorn, said housing having a reducing compartment through which the roll teeth deescend, said compartment defined on the outside by a side wall of the housing positioned to receive impact from the descending teeth, said housing having also an earcorn receiving compartment defined on the outside by a converging side wall positioned in close relation to ascending roll teeth, longitudinally spaced vertical walls dividing the receiving compartment into a series of elongated U-shaped open earcorn receiving pockets through which the ascending teeth travel, said pockets disposed at right angles to the axis of the rotative element and adapted to receive a downcoming ear of corn when oriented in parallel relation therewith, stationary means supplemented by agitation effected by said ascending teeth for orienting an angularly disposed downcoming ear of corn to fall into an underlying pocket, said stationary means being the vertical pocket walls formed with an upper edge that slopes downwardly toward the rotative element, and means for impelling an oriented ear of corn upwardly and forwardly from a pocket into the reducing compartment, said impelling means being an ascending roll tooth.

8. A machine as set forth in claim 7, further having guiding means for directing a pocketed ear of corn into the path of said ascending roll tooth, said means being the vertical pocket walls formed to project inwardly into the axial spaces between the ascending roll teeth.

9. In a machine for reducing bulk material having in combination, a housing for receiving material to be reduced, end and side walls defining the housing, one of the side walls having a stationary lower section and a movable section thereabove, a rotative element journaled in the end walls, teeth projecting from the rotative element for reducing material, the descending teeth delivering impact to both the upper and lower wall sections, and means effecting a handhole in the impact-receiving wall to provide access to uncrushable material intercepted in the reducing area, said means being the movable wall section pivotally hung to swing inwardly and upwardly above axis of said rotative element.

10. A machine as set forth in claim 9, further including leverage means associated with the pivotally hung wall section for manually moving said section inwardly and upwardly to displace material in contact therewith.

11. In a machine for reducing material having, in combination, a housing for receiving material to be reduced, end and side walls defining the housing, one of the side walls having a stationary lower section and a pivotally hung section thereabove, a rotative element journaled in the end walls, teeth projecting from the rotative element for reducing material, the descending teeth delivering impact to both upper and lower wall sections, said housing having a discharge outlet for reduced material, means for varying the rate of discharge, said means being said pivotally hung section adjustably positioned to vary its space relation with said stationary impact-receiving section, and means for limiting outward movement of the adjusted wall section.

12. A machine as set forth in claim 11, further having rotatable means associated with the housing for adjustably positioning the pivotally hung section and reacting against impact received by said section.

13. A machine as set forth in claim 11, further including means for closing the gap between the bottom edge of pivotally hung wall section and the upper edge of stationary wall section when the pivotal section is swung inwardly, said closing means being an arcuate flange projecting outwardly from bottom of said pivotal section.

14. In a machine for reducing material having, in combination, a housing that receives material to be reduced, end and side walls defining the housing, a toothed rotative element journaled in the end walls for reducing material fed into the reducing area, and means affording access to uncrushable material intercepted in said reducing area, said means being a section of a side wall pivotally hung to swing inwardly and upwardly.

15. A reducing machine as set forth in claim 1, further including means for pivotally mounting said movable section.

References Cited in the file of this patent

UNITED STATES PATENTS

| Number | Name | Date |
|---|---|---|
| 295,819 | Savits | Mar. 25, 1884 |
| 360,044 | Porter | Mar. 29, 1887 |
| 360,045 | Porter | Mar. 29, 1887 |
| 431,638 | Zimmerman et al. | July 8, 1890 |
| 517,104 | Harris | Mar. 27, 1894 |
| 925,614 | Townsend | June 22, 1909 |
| 1,456,034 | Newman | May 22, 1923 |
| 2,279,116 | Fink | Apr. 7, 1942 |
| 2,330,139 | Nickle et al. | Sept. 21, 1943 |
| 2,539,317 | Nickle et al. | Jan. 23, 1951 |
| 2,562,282 | Nickle et al. | July 31, 1951 |
| 2,675,182 | Wasalaski | Apr. 13, 1954 |